June 17, 1958 A. F. HARTWIG 2,838,788
METHOD OF AND APPARATUS FOR TEMPERING, QUENCHING
OR SIMILARLY TREATING SHEETS, BODIES
AND THE LIKE
Filed Nov. 1, 1954 13 Sheets-Sheet 1

INVENTOR:
ALBERT F. HARTWIG
By Gravely Lieder Woodruff & Wills
ATTORNEYS.

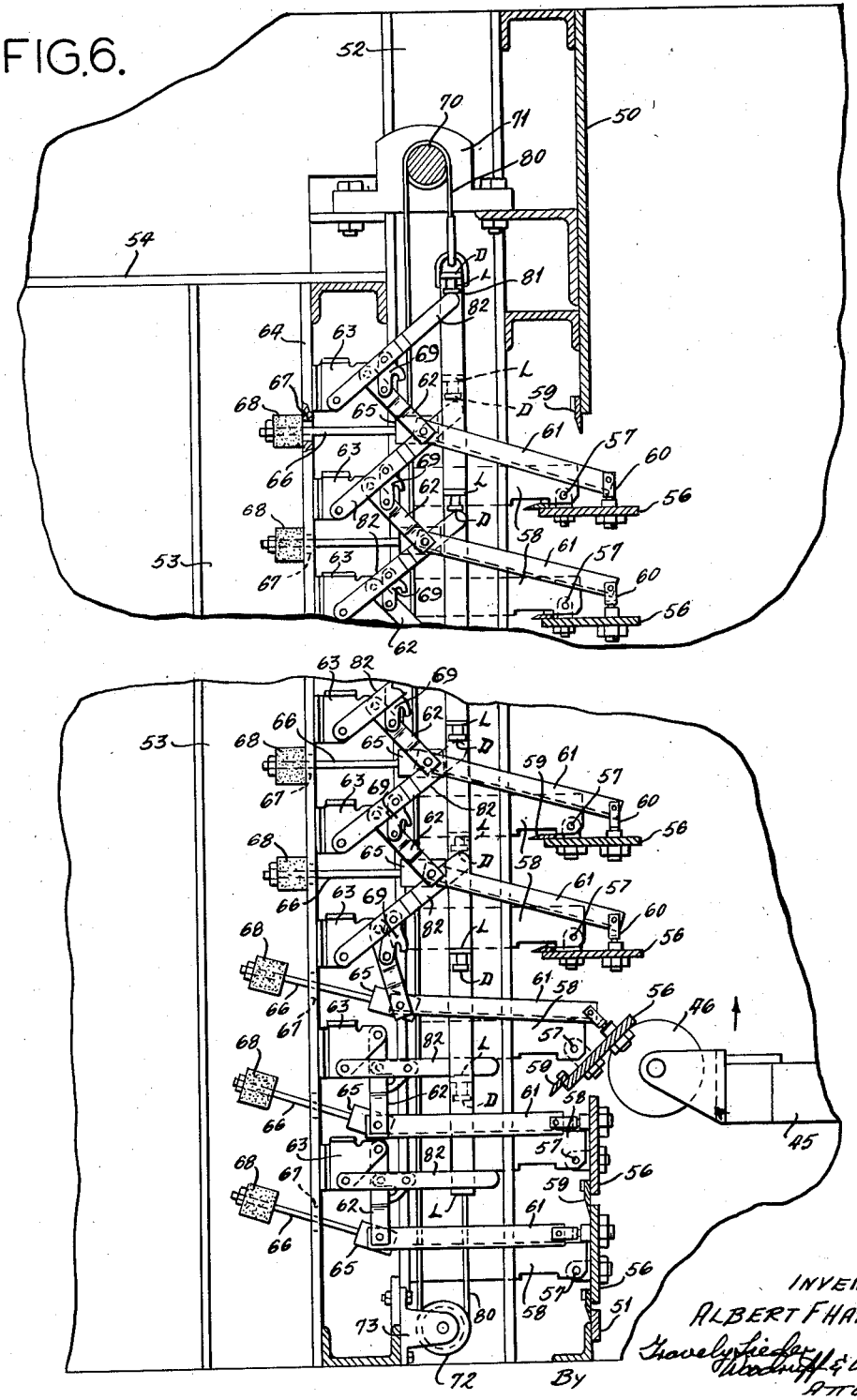

June 17, 1958 A. F. HARTWIG 2,838,788
METHOD OF AND APPARATUS FOR TEMPERING, QUENCHING
OR SIMILARLY TREATING SHEETS, BODIES
AND THE LIKE
Filed Nov. 1, 1954 13 Sheets-Sheet 6

INVENTOR
ALBERT F. HARTWIG
BY Gravely Lieder Woodruff & Wills
ATTORNEYS.

June 17, 1958 A. F. HARTWIG 2,838,788
METHOD OF AND APPARATUS FOR TEMPERING, QUENCHING
OR SIMILARLY TREATING SHEETS, BODIES
AND THE LIKE
Filed Nov. 1, 1954 13 Sheets-Sheet 7

INVENTOR:
ALBERT F. HARTWIG
By Gravely Lieder Woodruff & Wills
ATTORNEYS.

June 17, 1958 A. F. HARTWIG 2,838,788
METHOD OF AND APPARATUS FOR TEMPERING, QUENCHING
OR SIMILARLY TREATING SHEETS, BODIES
AND THE LIKE
Filed Nov. 1, 1954 13 Sheets-Sheet 8

INVENTOR
ALBERT F. HARTWIG
By Gravely, Lieder, Woodruff & Wills
ATTORNEYS.

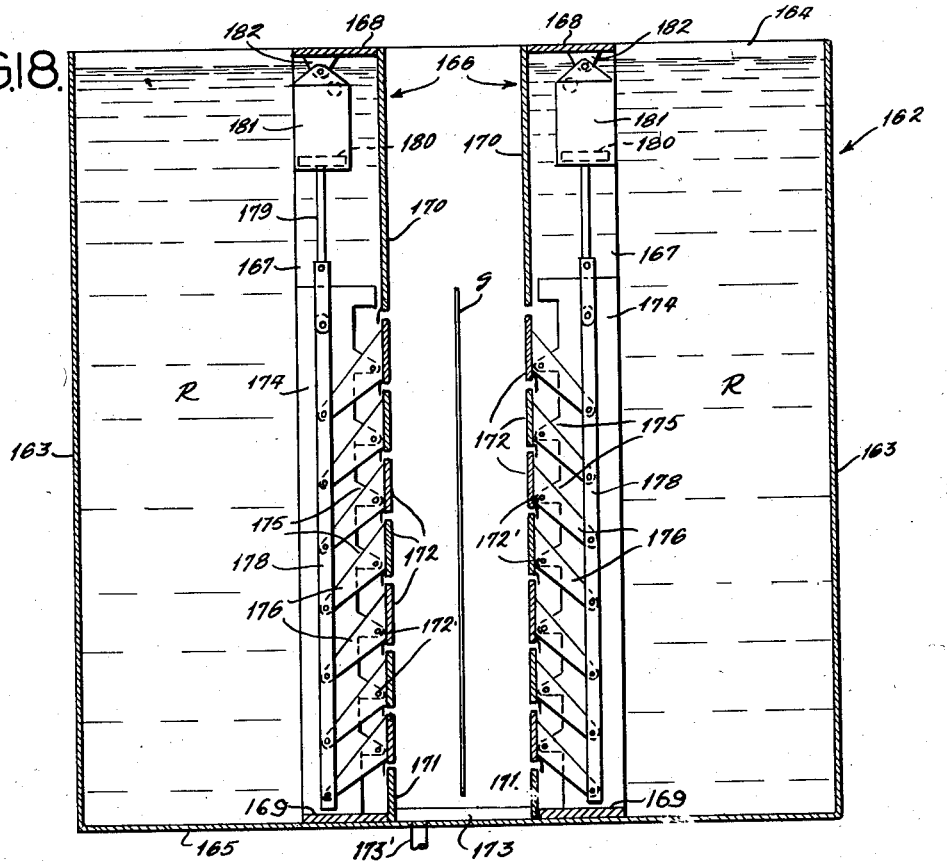

June 17, 1958 A. F. HARTWIG 2,838,788
METHOD OF AND APPARATUS FOR TEMPERING, QUENCHING
OR SIMILARLY TREATING SHEETS, BODIES
AND THE LIKE
Filed Nov. 1, 1954 13 Sheets-Sheet 10
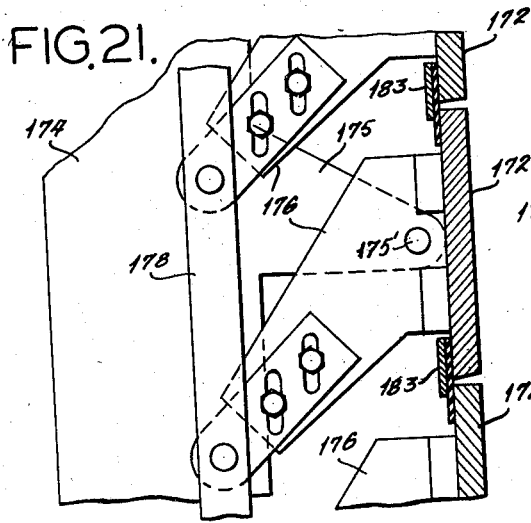
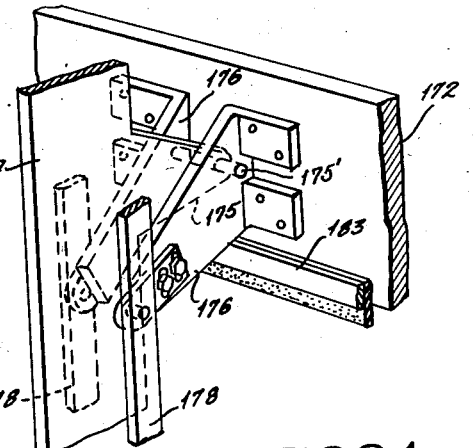
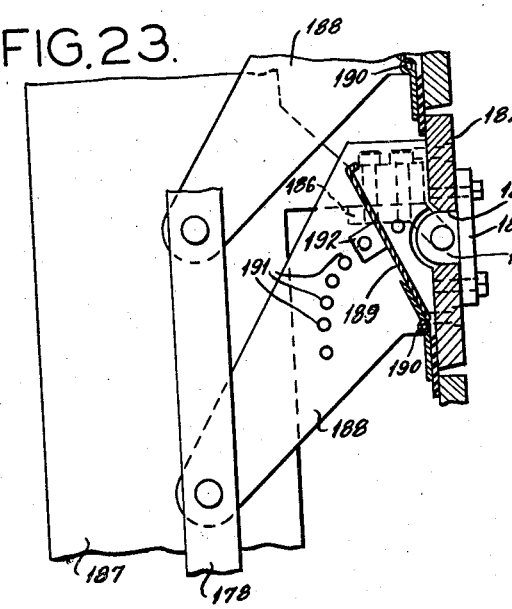
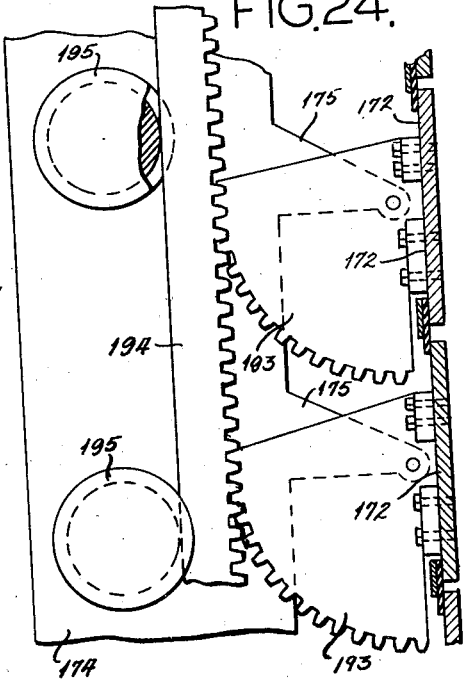
INVENTOR:
ALBERT F. HARTWIG
By Gravely, Lieder, Woodruff & Wills
ATTORNEYS.

June 17, 1958 A. F. HARTWIG 2,838,788
METHOD OF AND APPARATUS FOR TEMPERING, QUENCHING
OR SIMILARLY TREATING SHEETS, BODIES
AND THE LIKE
Filed Nov. 1, 1954 13 Sheets-Sheet 11
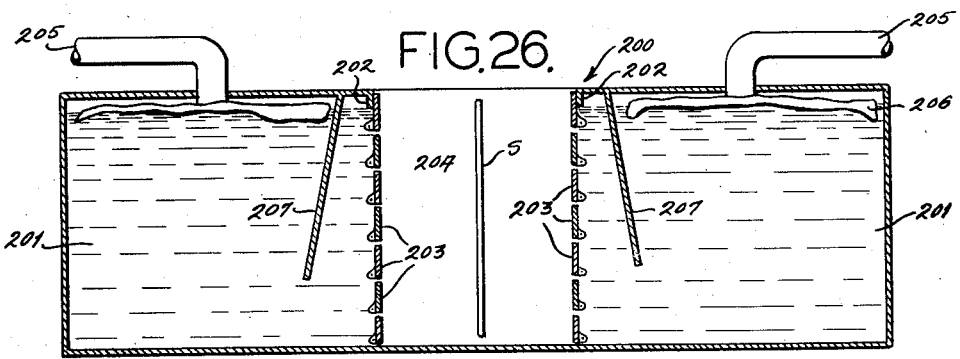
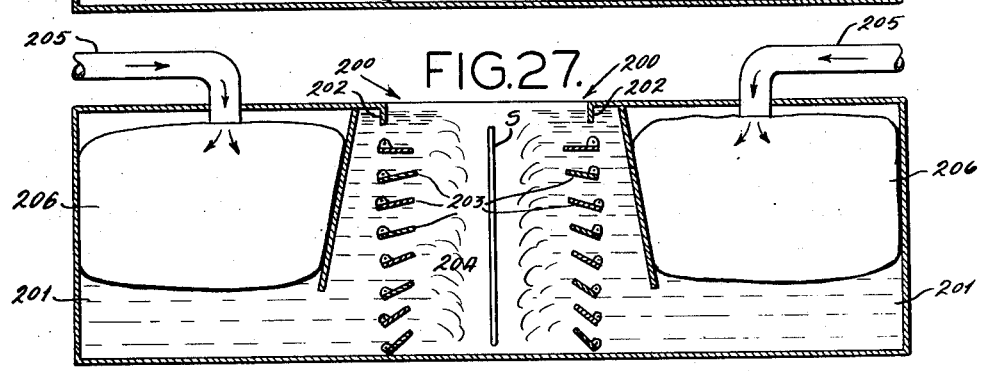
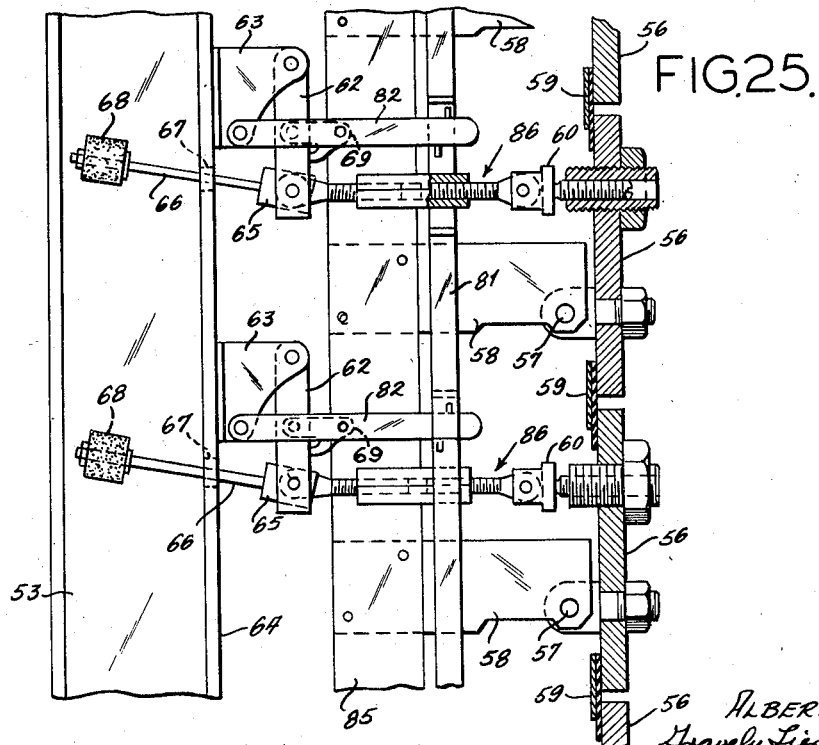
INVENTOR:
ALBERT F. HARTWIG
By Gravely, Lieder,
Woodruff & Wills
ATTORNEYS June 17, 1958 A. F. HARTWIG 2,838,788
METHOD OF AND APPARATUS FOR TEMPERING, QUENCHING
OR SIMILARLY TREATING SHEETS, BODIES
AND THE LIKE
Filed Nov. 1, 1954 13 Sheets-Sheet 12
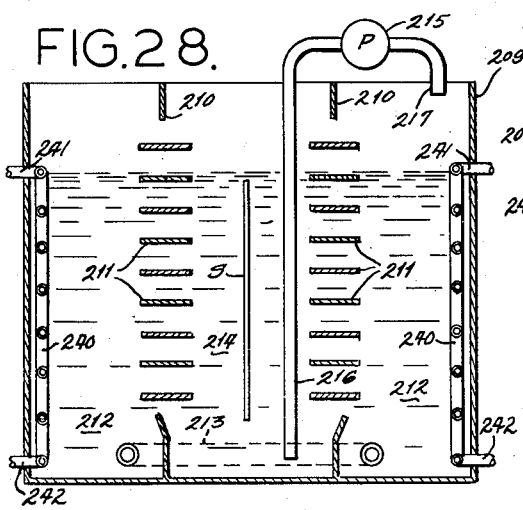
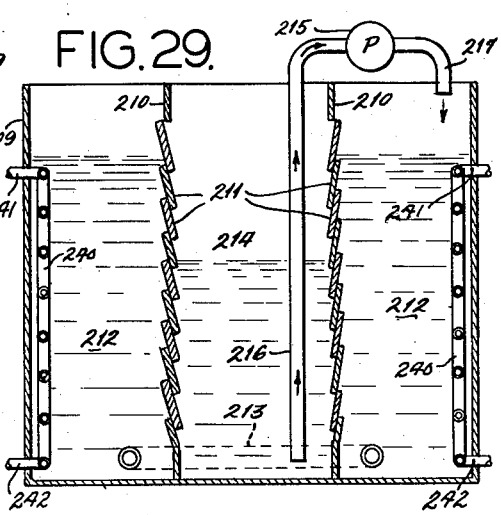
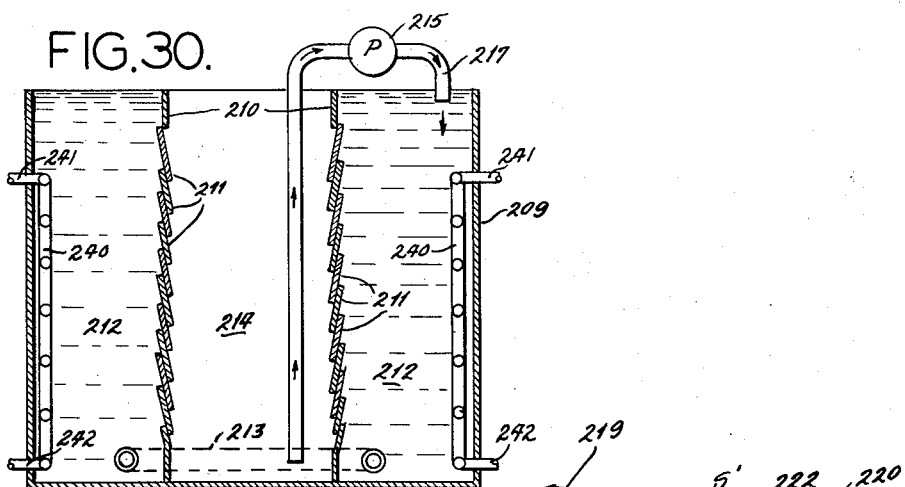
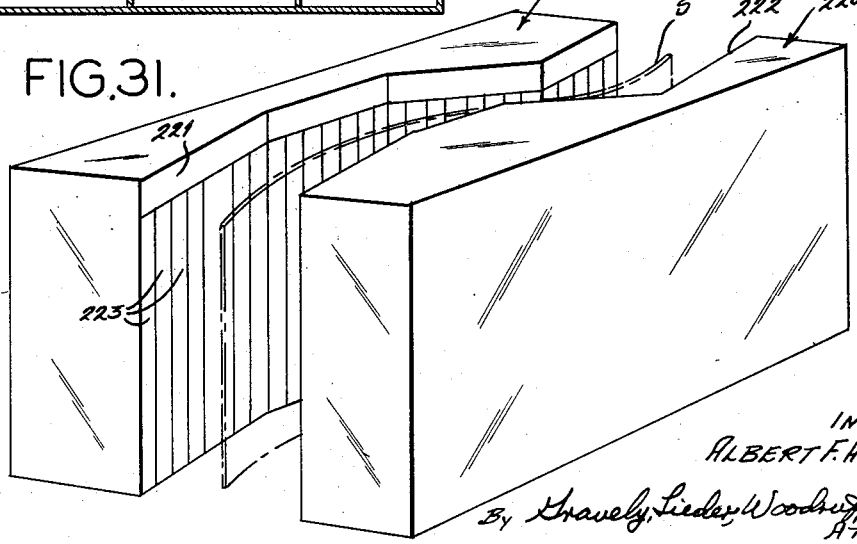
INVENTOR:
ALBERT F. HARTWIG
By Gravely, Lieder, Woodruff & Wills
ATTORNEYS.

June 17, 1958 A. F. HARTWIG 2,838,788
METHOD OF AND APPARATUS FOR TEMPERING, QUENCHING
OR SIMILARLY TREATING SHEETS, BODIES
AND THE LIKE
Filed Nov. 1, 1954 13 Sheets-Sheet 13
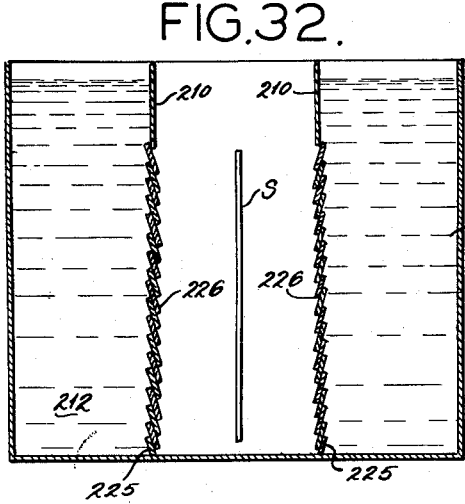
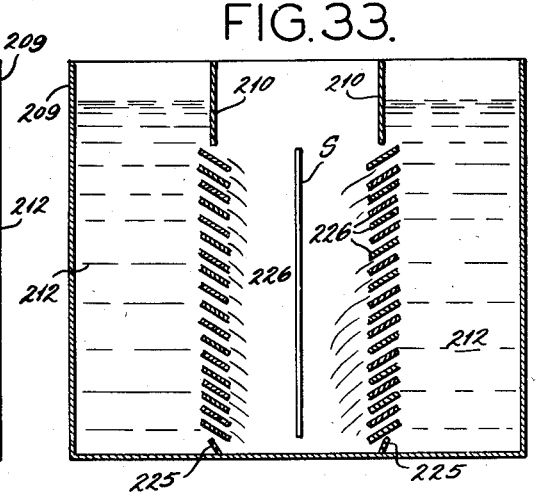
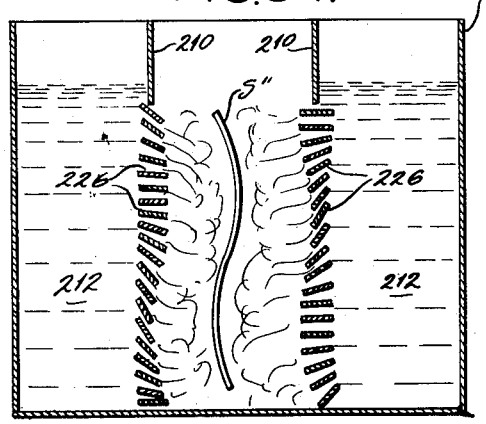
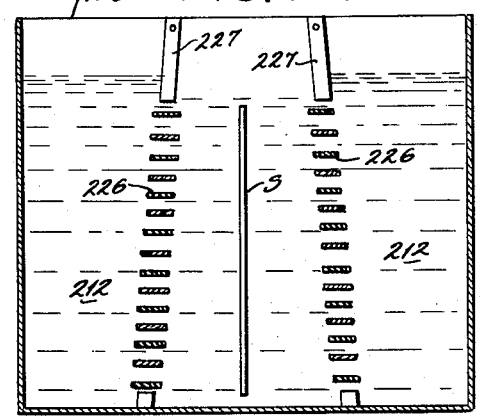
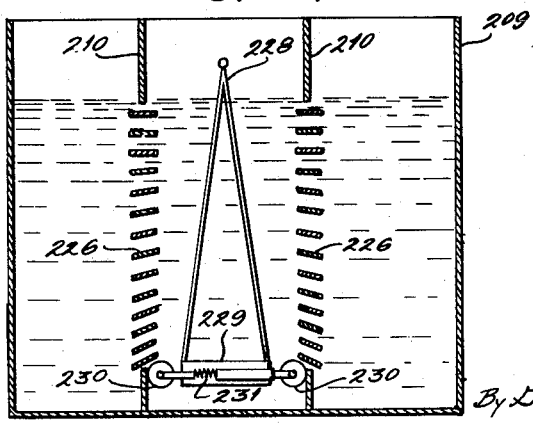
INVENTOR:
ALBERT F. HARTWIG
By Gravely, Lieder, Woodruff & Wills
ATTORNEYS.

United States Patent Office 2,838,788
Patented June 17, 1958

2,838,788

METHOD OF AND APPARATUS FOR TEMPERING, QUENCHING OR SIMILARLY TREATING SHEETS, BODIES AND THE LIKE

Albert F. Hartwig, University City, Mo., assignor to McDonnell Aircraft Corporation, St. Louis, Mo., a corporation of Maryland Application November 1, 1954, Serial No. 465,997

36 Claims. (Cl. 18—1)

This invention is directed to improvements in the method of tempering bodies and sheet material, and to certain preferred forms of apparatus whereby the benefits of the method may be easily realized.

An object of the invention is to provide a method of tempering sheets, bodies and the like which will yield better results by causing the sheets or bodies to be less subject to distortion reactions than heretofore when using conventional spray, immersion or dip methods, or combinations thereof.

An object of the invention is to provide apparatus having various forms, but possessing characteristics which will adapt it to fit most of the requirements of the method and enable the method to be put into practical use.

An object hereof is to provide a body or sheet tempering method which will substantially avoid distorting effects on the sheets or bodies being treated and accomplish the same in a very simple way with the aid of inexpensive apparatus.

An object hereof is to provide apparatus constructed to provide a tempering zone or confined area, spaced tempering fluid storing means, and fluid flow discharge control valve means operable to result in the released tempering fluid engulfing, surrounding and bathing the surfaces of the body being treated substantially at the same time so that unequal shrinkage may be avoided as fully as possible.

It is an object to provide improved apparatus for carrying into practical use the method hereof, and to adapt the apparatus to practice the method upon differently or irregularly shaped bodies with substantially the same facility as it can be applied to regularly shaped bodies.

It is another object of the invention to provide apparatus of simple and efficient construction which will be capable of use with sheet material of any desired size and having flat as well as non-flat surface characteristics, by placing the sheet material free of restraint of any kind in a confined zone or container and arranging tempering fluid discharge control means in the walls of such zone or container so that the surfaces of the sheet are substantially simultaneously and uniformly engulfed and contacted by the fluid.

It is also an object hereof to provide means for regulating the tempering fluid discharge through valve controlled openings which will deliver the fluid upon the surfaces of sheet material in uniform volume depthwise and lengthwise thereof to avoid warping and uneven hardening.

The present invention consists in such suitable apparatus and tempering fluid control means as will best serve to carry out the steps in the method of storing or collecting the fluid adjacent to the confined tempering zone where the body or sheet can be properly located and supported free of restraint of any kind and with its surfaces free of obstructions. The invention also consists in means for controlling the discharge or delivery of the tempering fluid upon the surfaces of the body or sheet so that the surfaces are rapidly contacted and engulfed substantially uniformly and at nearly the same instant to cause unhampered shrinkage and tempering thereof equally, and thereby reduce distortion and improve the physical properties by reducing intergranular corrosion and other effects.

The invention also consists in certain forms of apparatus hereinafter described which includes tempering fluid reservoir means located at the sides of an initially empty zone adapted to receive the body or sheet to be tempered, and suitable valve or louver means disposed between the reservoir and the tempering zone with control means for operating the valve or louver means to deliver the fluid for rapid and uniform contact with the surfaces of the body or sheet to be tempered.

This invention further consists in the method and in the apparatus and components of such apparatus now to be described in more detail in view of the accompanying drawings, wherein:

Fig. 6 is another greatly enlarged broken transverse sectional elevational view of the control means for the valves or louver means showing the latter in different stages of the closing operation;

Fig. 18 is a transverse sectional elevational view of modified tempering apparatus wherein the reservoir for the tempering fluid is equipped with assembled units having valves or louver means and controls therefor;

Fig. 19 is a perspective view of the valves or louver means and controls comprising the units associated with the modified apparatus shown in Fig. 18;

Fig. 20 is an enlarged fragmentary transverse sectional elevational view of a still further modified control for the valves or louver means, the same constituting a modification of Fig. 8;

Fig. 21 is an enlarged fragmentary transverse sectional elevational view of the valves or louver means associated with the modified apparatus of Fig. 18;

Fig. 22 is an enlarged perspective view of a typical control arrangement of the means shown by Fig. 21;

Fig. 23 is a modified control arrangement of the means shown in Fig. 21, but disclosing adjusting means therefor;

Fig. 24 is an enlarged fragmentary transverse sectional view of a further modification of control means for the valves or louver means useful in the apparatus of Fig. 1 or 18;

Fig. 25 is an enlarged fragmentary transverse sectional view of control means for the valves or louver means, this view being a modification of the means shown in Fig. 6;

Figs. 26 and 27 are diagrammatic transverse sectional elevational views of a further modified tempering apparatus, Fig. 26 showing the initial condition prior to discharge of the tempering fluid and Fig. 27 showing the fluid being discharged;

Figs. 28, 29 and 30 are diagrammatic transverse sectional elevational views respectively of the tempering apparatus showing the completion of a tempering operation, the partial evacuation of the tempering zone, and the fully evacuated tempering zone;

Fig. 31 is a diagrammatic perspective view of the tempering fluid reservoir means and vertically directed valves or louver means constructed to receive a sheet having other than a flat form;

Figs. 32 and 33 are further diagrammatic transverse sectional elevational views of the tempering apparatus respectively showing the relation of the reservoirs and valve or louver means prior to discharge of the fluid and at the moment of fluid discharge;

Fig. 34 is a view similar to Fig. 33, but showing a modified operation of the valves or louver means to accommodate a sheet of other than flat form;

Fig. 35 as a view, similar to Fig. 33, but showing a different or angular arrangement of valves or louver means; and Fig. 36 is a view similar to Fig. 32, but showing a roller frame adapted to close the valves or louver means upon withdrawal.

The present invention involves a method of tempering or quenching or similarly treating sheet material, although other bodies may be treated also, in such a manner that the treating medium, such as water, can be applied or discharged upon the surfaces of the pre-heated sheet to contact the sheet on all of its surfaces at substantially the same instant. This has the advantage of causing the sheet to shrink equally or uniformly and thereby prevents distortion. The invention is particularly useful in tempering sheet material, such as is needed in the construction of aircraft skin panels and the like where distortion is critical and undesirable. The term "temper" is understood to include within its meaning the terms "quench" and "treat" as they are used in the art to which this invention appertains.

Figure 1:
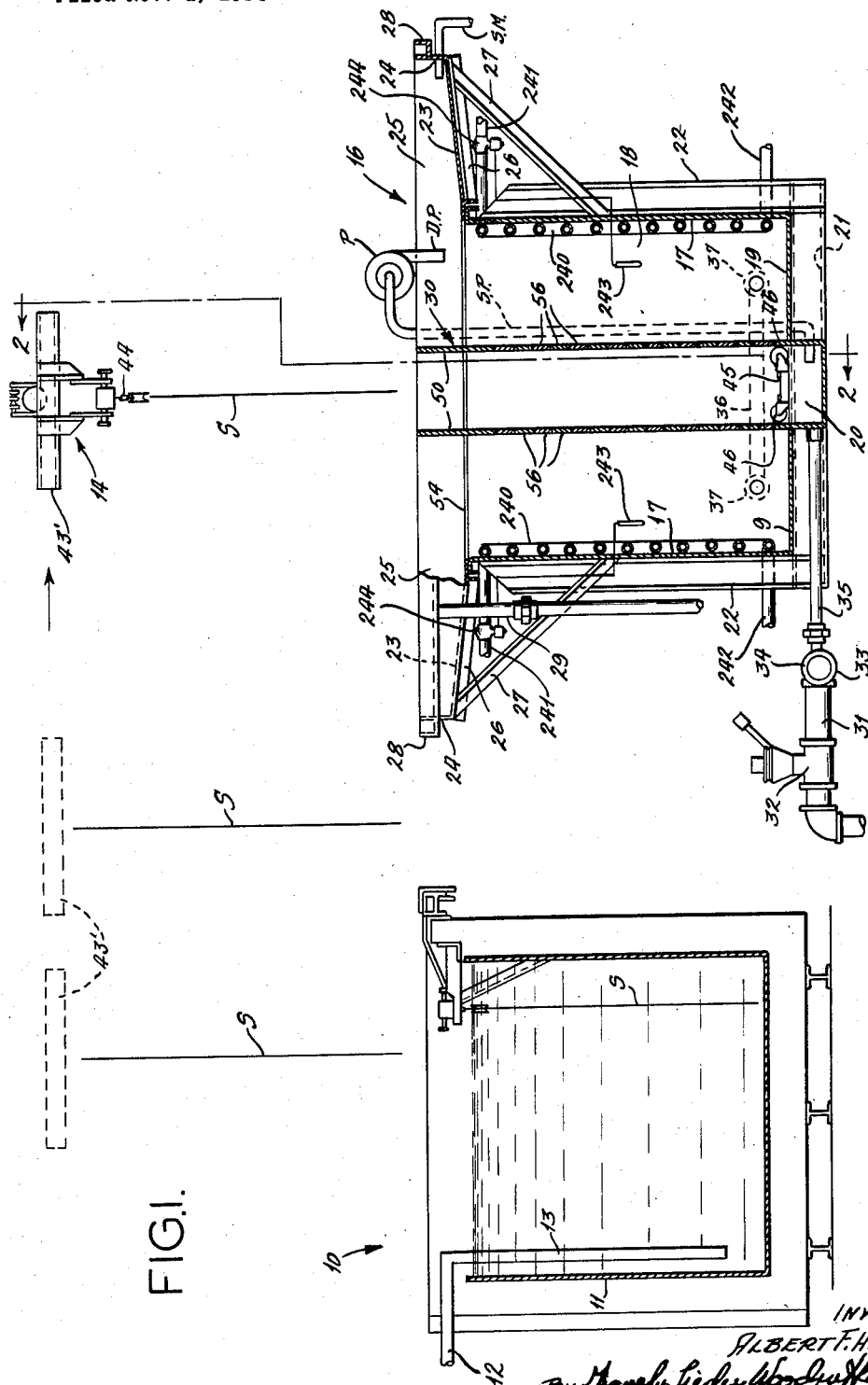
Fig. 1 is an end elevational view, partly diagrammatic and partly in section, of one embodiment of apparatus suitable for carrying into practice the method of this invention.

One embodiment of the invention is disclosed in Fig. 1 wherein there is shown a suitable heating vat 10 having the inner bath tank 11 in which a number of sheet panels S may be immersed to be heated. In this case, the tank 11 may contain a salt bath heated by electrical units 13 supplied from a bus 12, the units 13 being suspended above the tank bottom. After proper heating the sheet S is hoisted from the vat 10 by overhead hoist means 14 operating upon suitable tracks 15 to enable the hoist 14 with a sheet S to be immediately moved above the tempering apparatus 16, whereupon it can be lowered into such apparatus.

Figure 2:
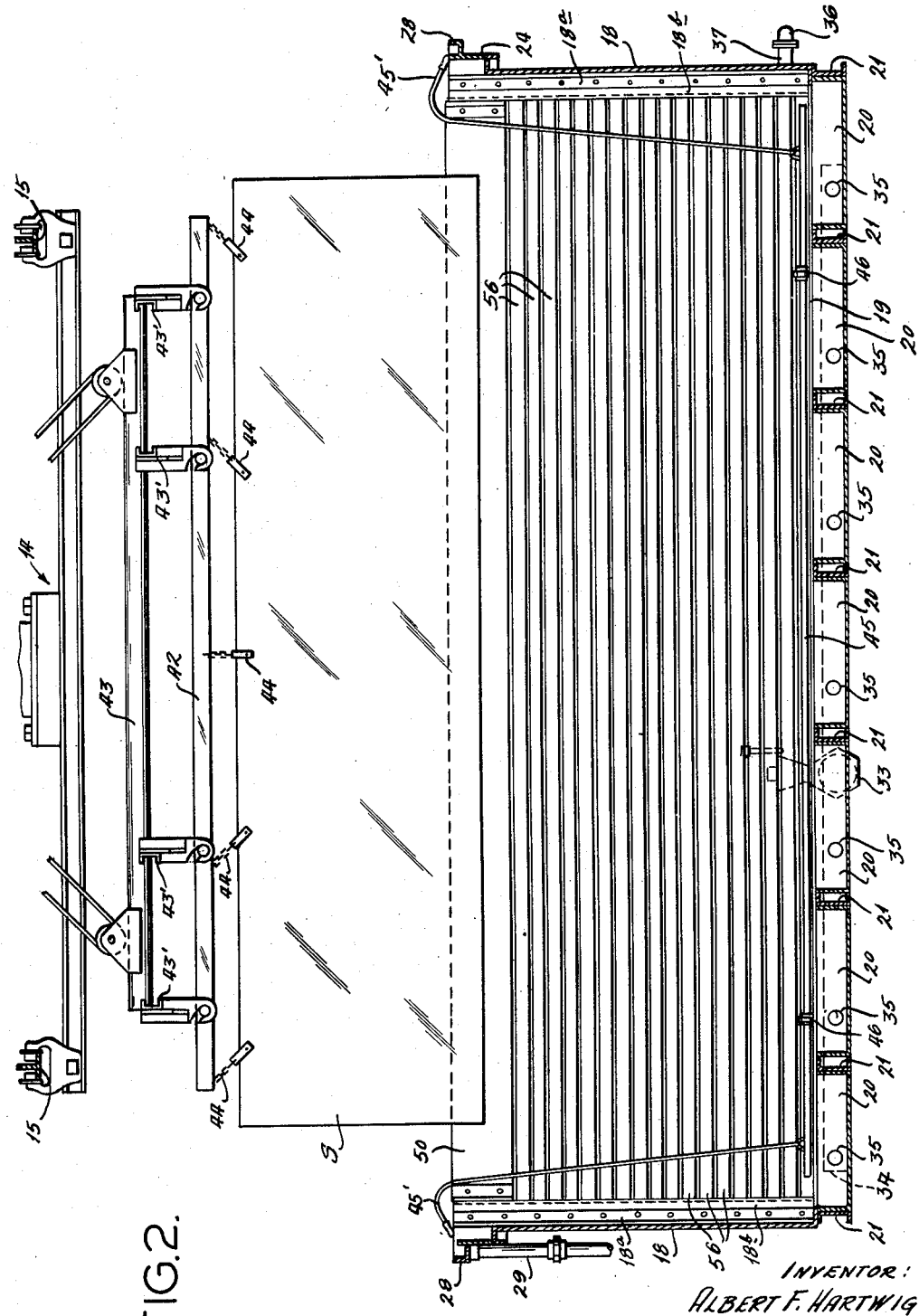
Fig. 2 is an enlarged longitudinal sectional elevational view of the tempering apparatus as seen along line 2—2 in Fig. 1, with a sheet to be tempered about to be placed therein.
Figure 3:
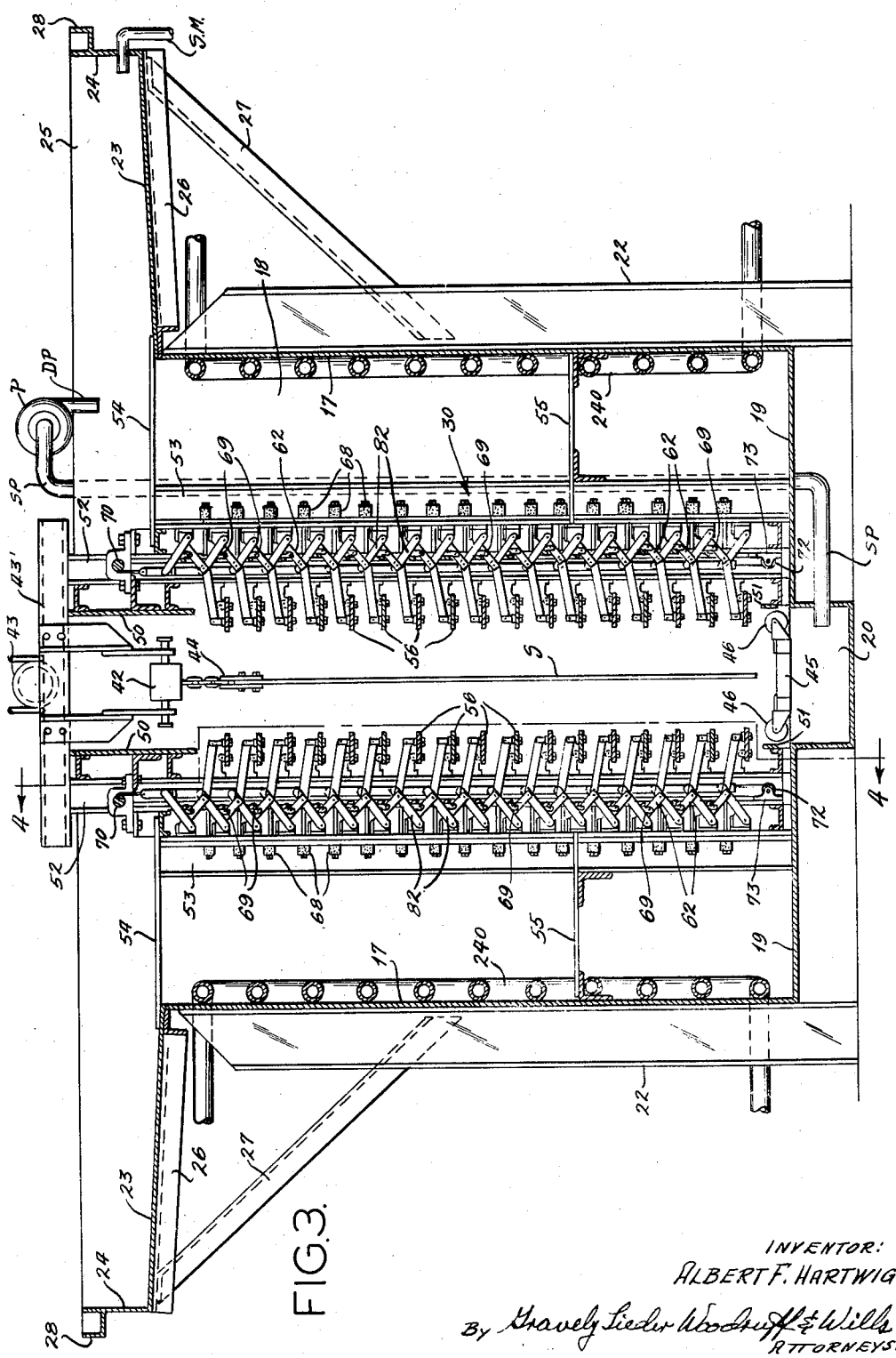
Fig. 3 is an enlarged transverse sectional elevational view of the apparatus shown in Fig. 2, but with the sheet placed therein and the valves open.

The apparatus 16 disclosed in more detail in Figs. 2 and 3, includes a tank structure having outer longitudinal walls 17, end walls 18, and bottom walls 19, the latter walls having a longitudinally directed centrally located series of sumps or wells 20. The tank bottom is supported by a plurality of transversely extending stringers 21, some of which extend between the respective sumps 20 (Fig. 2). The side walls 17 are braced by vertical members 22 suitably secured to the walls and connected at the lower ends to the stringers 21 to form a secure outer framework to retain the tank walls 17 against outward movement due to the weight of the tempering fluid. The open top of the tank is provided at each longitudinal side with relatively shallow wing tanks formed by sloping bottom walls 23, outer side walls 24, and opposite end walls 25. These wing tanks are supported on a plurality of transversely directed ribs 26, each of which is braced by a diagonal strut 27. The periphery of the open top of the tank is bounded by a gutter 28 which is suitably drained through the conduit 29.

The tank structure constitutes a tempering fluid reservoir having the wing tank reservoirs to supply adequate fluid to take care of complete submergence of the material in those cases where insufficient head room is found. The reservoir is separated into two side tank portions by a centrally located structure 30 of controllable valves or louver means later described. The lower portion of the structure 30 is open to the sumps 20 so that the interior area may be drained or evacuated between processing operations. To drain these sumps 20, a main drain conduit 31 having the control valve 32 is connected at fitting 33 to a longitudinal drain header 34 which, in turn, is connected by a plurality of lateral conduits 35 connected into the respective sumps 20. Tempering fluid reservoir portions at the sides of the structure 30 are cross connected by an equalizing conduit 36 opening to the reservoir portions at suitable fittings 37. A recirculating pump P mounted near the top of the tank draws fluid from the central area set apart by structure 30 through suction pipe SP and returns the same to one of the side tank spaces through delivery pipe DP. A suitable source of fluid is connected by the supply main SM to a wing tank, with the conduit 36 serving to equalize the fluid in all reservoir portions. The central area within the structure 30 may be drained by the conduit system associated with the sumps 20. If desired the pump P may not be used and a fresh quantity of tempering fluid may be brought in by pipe SM and released to waste at 31 when each cycle is completed.

In Fig. 2 the hoist 14 is shown provided with a sling device in which a spreader member 42 connected to a sling frame 43 is provided with a plurality of clamps 44 to be attached to the sheet S so that the latter may be easily moved into the evacuated tempering zone defined by structure 30 (Fig. 1) and supported therein on the lateral ribs 43' of the sling frame 43. Prior to locating the sheet in the tempering zone (Figs. 1, 2 and 3), a frame 45 is lowered into position and in so doing side rollers 46 thereon are adapted to roll over the control valves or louver means (to be described). The rollers 46 are then in a position to again roll over the valves and return the same to closed position automatically upon withdrawal of the frame by means of the hoist cables 45' which are connected to the hoist 14 for this operation. The action of rollers 46 is to push on link 61 and rotate link 62 so that the drive link 69 pulls down on lever 82 to carry the toggle over the position of high closing forces and make it easy to move bar 81 to the down position. The push on link 61 is obtained through the associated valve 56 (Fig. 6).

Structure 30 is shown diagrammatically only in Figs. 1 and 2, but in more detail in Figs. 3 to 7 and reference will now be had to these latter views. This structure 30 comprises upper vertical wall partitions 50 braced by suitable longitudinal angle and channel members fixed at their ends to the end walls 25, and lower vertical wall partitions 51 in line with partitions 50 and similarly braced. The partitions 50 and 51 are suitably sealed to the end walls 18 of the tank so that no fluid may leak into the tempering zone. The seals (Fig. 2) include cooperating angle members 18a and 18b which also form a surface on which the valves may seat. A vertical column 53 is located outwardly of each column 52 to act as a support and brace. The columns 53 support a frame 54 at the top and an intermediate frame 55, both being horizontally directed and of perforated or open frame character so that the tempering fluid will not be prevented from free flow during filling or discharge of the reservoir portions. The frames 54 and 55 provide support to the valves or louver means and the control system therefor. There may be several columns 52 and 53 spaced along the length of the tank.

Figure 4:
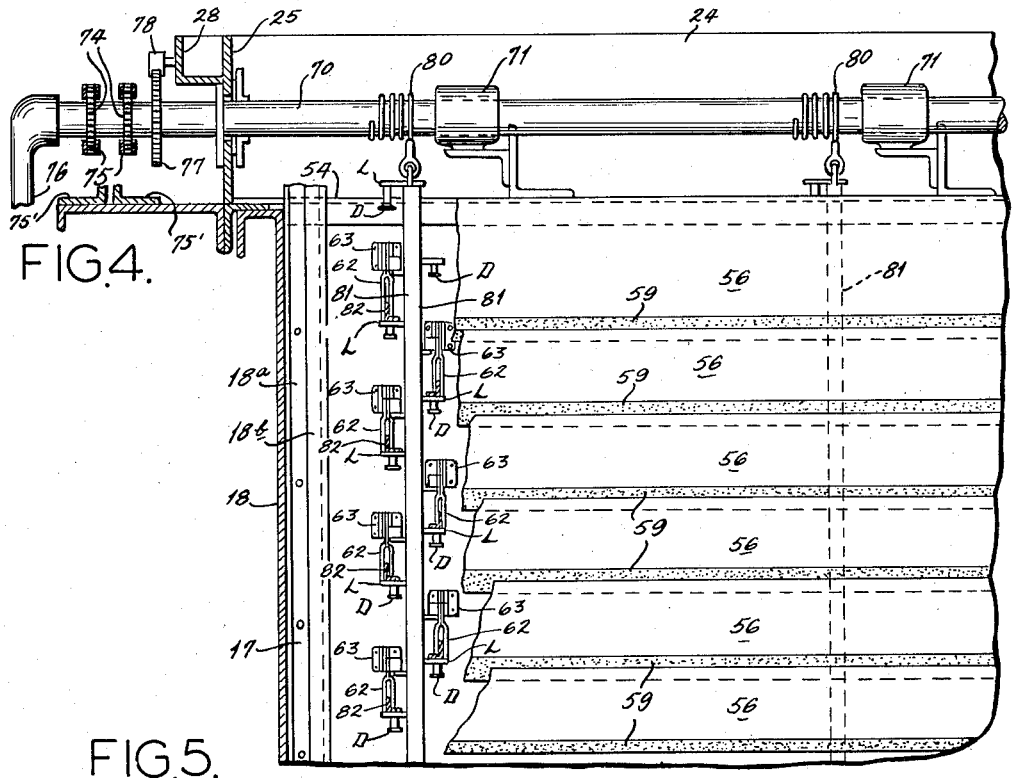
Fig. 4 is an enlarged fragmentary longitudinal sectional elevational view of the apparatus as seen along line 4—4 in Fig. 3, but with the valves closed.
Figure 5:
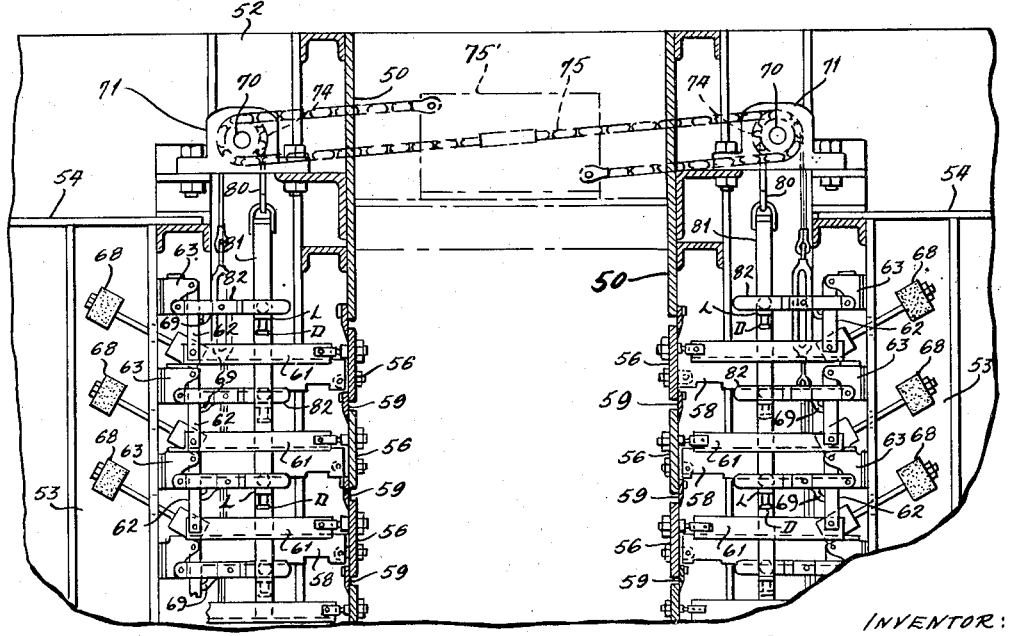
Fig. 5 is an enlarged fragmentary transverse sectional view of the valves or louver means and the controls therefor.

The vertical gaps or openings between the respective upper and lower aligned partitions 50 and 51 are controlled by a plurality of horizontally directed and elongated valves or louver means 56 which are in open position in Fig. 3 and closed position in Figs. 4 and 5. Thus, the partitions 50 and 51 with the valves 56 form spaced walls along the sides of the tempering zone, and the valves 56 are adapted to hold the fluid within the reservoir portions of the tank until a sheet S is properly located as shown in Fig. 3 and ready for tempering treatment.

Since there are two sets or groups of valves 56, as shown in Figs. 3 and 5, and since these are different in that they are right and left handed, it will be necessary to describe only one group (Fig. 6), it being understood that the reference numerals will be applied to similar parts in both groups. Referring to Fig. 6, each valve element or louver means 56 is pivoted at pin 57 upon a fixed arm 58 secured to the stationary column 52 extending from top to bottom of the tank. Of course, the valve means 56 may have suitable end pivots as suggested by Fig. 19. Each valve 56 carries a seal 59 on one margin so that in the closed positions (Fig. 5) the seals 59 contact an adjacent valve. The exception to this is that the top seal 59 is carried by the lower margin of partition 50 and the bottom valve mounted seal engages the margin of lower partition 51. Fig. 6 illustrates several positions for one group of valves 56 to demonstrate the action thereof and the effect of the seals with the valves closed.

The upper portion of Fig. 6 discloses that each valve 56 has a pivot forming element 60 to which one end of a push link 61 is connected. The opposite end of push link 61 is pivotally connected to an intermediate link 62, and link 62 is pivoted to a stationary bracket 63 carried on the spaced column 53 at the nearest flange 64 thereof. The pivotal connection between the links 61 and 62 carries a bracket 65 to which is connected one end of a check rod 66. The free end of the check rod 66 extends through an aperture 67 in the column flange 64 and an adjustable resilient stop element 68 is mounted thereon. Each stop 68 is adjusted to limit the open position of the associated valves by engaging the flange 64 and thereby fix the outward movement of the push links 61 as desired. Each link 62 has a pivotally connected drive link 69 which will be described presently. Obviously, the valve 56 has a plurality of spaced pivots and the columns 52 with arms 58 are arranged along the length of the valves.

The control means, referring now to Figs. 4, 5, 6 and 7, includes a pair of upper rotary shafts 70 mounted in suitable bearings 71 spaced along the length thereof. Cooperating with the shafts 70 are suitable pulleys 72 (one being shown) mounted in bearings 73 adjacent the bottom walls 19 of the tank. The upper shafts 70 (Figs. 4 and 7) extend at one end outwardly of the wall 25 below the gutter 28. Each shaft extension carries a pair of sprockets 74, each to receive a drive chain 75. The chain 75 between one aligned pair of sprockets 74 (Fig. 7) passes over one and under the other with the ends connected to a common slide anchor 75'. The other pair of aligned sprockets 74 has the chain 75 reversed relative to the one just mentioned, with the chain connected to slide anchor 75'. Each chain has a suitable adjusting device, such as a turnbuckle. Both shafts 70 are provided with cranks 76, and both shafts 70 are provided with ratchets or one way gears 77. Ratchet dogs 78 are suitably pivoted on the wall 25 adjacent the gears 77 to engage and prevent rotation of the shafts reversely of the desired direction. It is now evident that shafts 70 must operate together but in reverse directions.

Again referring to Figs. 4 and 6 particularly, the rotary shaft 70 shown, and the same applies to the other shaft, has a flexible drive cord or cable 80 wrapped about it for several turns. The middle of this cable 80 is fixed to the shaft, one end is connected to the upper adjacent end of a control bar 81, and the other end extends to and about the lower pulley 72 and then connects with the opposite lower end of bar 81. The control bar 81 thus is suspended adjacent column 52 for movement in a vertical path with sufficient lateral flexibility in the cable 80 to allow bar 81 to move sidewise with the arcuate swing of levers 82. This bar 81 is engaged by the ends of a plurality of levers 82 and the opposite ends of these levers are pivoted to the brackets 63 (Fig. 6). The particular engagement is obtained by lifters L (Fig. 4) engaging levers 82 and by depressors D also engaging the same levers in the opposite motion.

The operation of the valves 56 and the control system therefor is as follows: It is assumed that valves 56 are closed, that the frame 45 is in place, a sheet S is in place, and the reservoir is filled. The attendant first operates the cranks 76 to release dogs 78 and then reverses the cranks to trip the valves 56. The weight of fluid suddenly unresisted forces open the valves after the bar 81 has elevated levers 82 far enough to break the dead center toggle effect of the drive links 69 relative to levers 82 (Figs. 5 and 25). Once broken, the links 61 then accelerate the action due to the fluid forces present and the valves 56 drop open. Due to the toggle linkage effect, it is easier to close the valves 56 by the the rollers 46 as the initial force on links 61 is reduced relative to the force needed at levers 82, but the final closure is assured by reversing the cranks 76 to pull down on the bars 81.

Fig. 25 discloses a modification of the valves and control means just described for Fig. 6 and similar parts will be designated by the reference numerals heretofore indicated. Each of the valves or louver means 56 with its marginal seal 59 is pivoted at pin 57 to the fixed arm 58 as before, and these arms 58 are secured to a suitable supporting column 85 having the same function as column 52. The column 53 carries the spaced brackets 63 to which links 62 are pivotally connected. Each link 62 is now connected to an adjustable push link 86 which has the same function as push link 61 before pointed out. The adjustable push links 86 are pivotally connected to pivot elements 60 and adjustably connected to the valves 56, the sectional detail of elements 60 in Fig. 25 being intended to show the construction only generally shown in Fig. 6. The pivotal connections between links 62 and 86 are provided with brackets 65 on which check rods 66 are mounted, and the flange 64 of column 53 is formed with apertures 67 for these rods. Again stop elements 68 are adjustably mounted on rods 66. The bar 81 is operated as before, and levers 82 pivoted to brackets 63 are actuated upon movement of the bar 81, the drive links 69 interconnect levers 82 and links 62.

Figure 8:
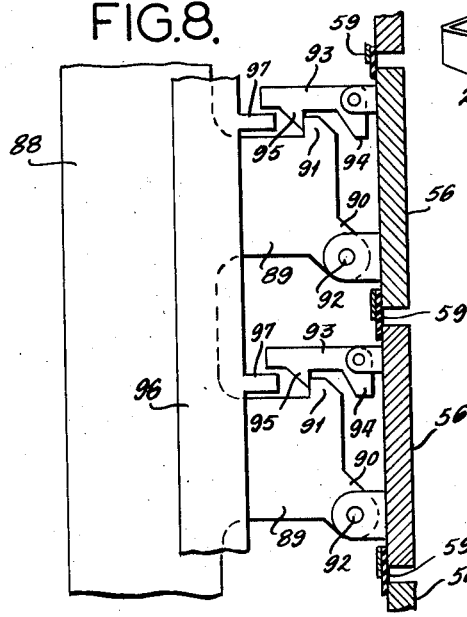
Fig. 8 is a fragmentary transverse sectional elevational view of a modified control arrangement for the valves or louver means.

Fig. 8 discloses a modified control system for the valves 56 which may be substituted for the system of Fig. 6 for example. In this assembly, the column 88 replaces column 52 and pivot forming members 89 are carried by the column to provide pivot bearings 90 and a cam stop 91. Each valve 56 is pivoted to a bearing 90 at pin 92, and each has a pivoted dog 93 with a stop finger 94 adjacent the pivot and an outwardly spaced cam finger 95. The finger 94 limits downward movement of the dog 93 so that the beveled face of the finger 95 can cooperate with the beveled face of the cam stop to lift the dog until the finger 95 engages the stop 91 to hold the valve closed. Valve release is obtained by providing a bar 96 having dog release projections 97 thereon. The bar 96 is movable relative to the column 88 by means similar to the rotary shafts 70 and cables 80 to raise the projections 97 and lift the dogs 93 from the stops 91 so that the valves are free to swing open under the pressure of the tempering fluid at the left side thereof as viewed in Fig. 8. Closing actuation of the valves 56 is obtained by the action of the rollers 46 upon withdrawal of the sheet S, as before described. Variable spacing of projections 97 provides selective valve operation.

Figure 9:
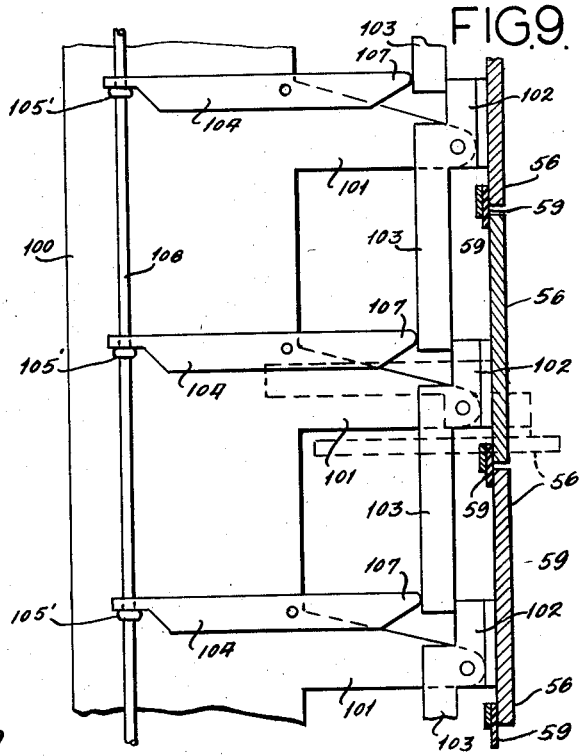
Fig. 9 is a fragmentary transverse sectional elevational view of another modified control arrangement similar to that shown in Fig. 8.
Figure 7:
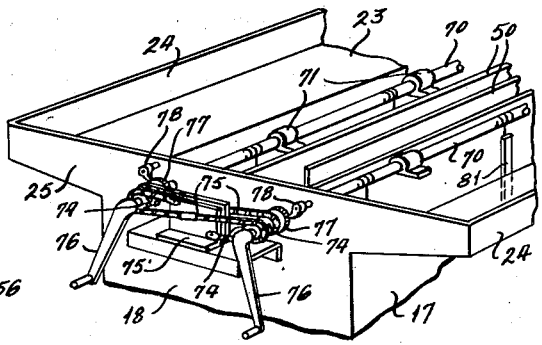
Fig. 7 is a fragmentary perspective view of the apparatus showing the operating means for tripping and locking the valves or louver means.

Fig. 9 is a fragmentary view of another modified valve and valve control system which may be used for the system shown in Fig. 6. Here the column 100 is provided with arms 101 and valves 56 are provided with rear brackets 102, each having a depending arm 103 with a free end which is adapted to rest upon the next lower bracket 102 when the valves are fully closed. Each arm 103 has a locking lever 104 pivoted to the column 100 intermediate its ends. The ends 105 of these levers are adjustably connected to a cable 106 by cable beads 105' movable along the cable. The control of cable 106 is similar to that for bar 81. The opposite ends 107 of levers 104 are held by system friction against the arms 103 to lock the valves closed until movement of the cable 106 swings the levers in unison to release the arms. The pressure of the tempering fluid at the left side of the valves, as viewed in Fig. 9, will cause opening action of the valves.

Figure 10:
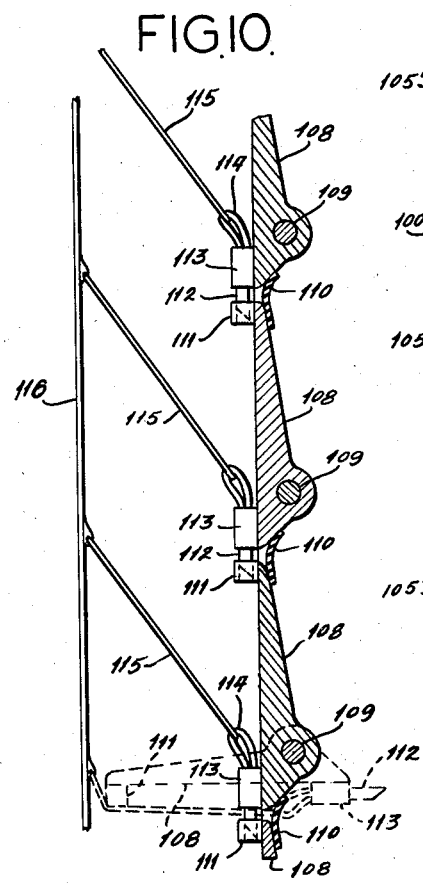
Fig. 10 is a further fragmentary transverse sectional elevational view of a modified control arrangement for the valves or louver means, and modified valves or louver means to be operated thereby.

In the system shown by Fig. 10, the valve control means is located at the dry side or within the treating zone. With suitable reversal of parts, the valves 108 may be pivotally mounted at pins 109 upon any of the previously described column arms, as arms 101 in Fig. 9, and each valve has its seal 110 engaging the next adjacent valve. The valves 108 are held in closed positions by means of a hasp 111 carried on the back of one valve and an engaging spring bolt 112 operatively carried in a housing 113 on the adjacent valve. The housing 113 carries the usual spring means (not shown) by which the bolt 112 is normally urged outwardly to snap back in the hasp 111. Each spring bolt 112 is provided with a flexible pull loop 114 and pull cords 115 are connected between these loops and a common actuating cable 116 moved by the rotary shafts 70 as before described in Fig. 6.

Figure 11:
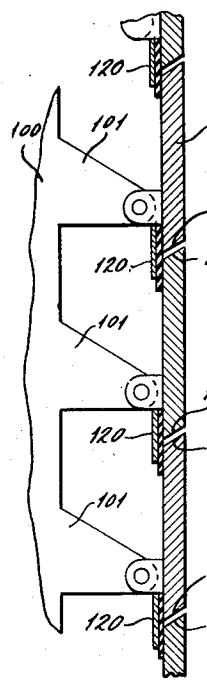
Figs. 11, 12, 13 and 14 are respectively fragmentary transverse sectional elevational views showing different arrangements for effecting closure and sealing of the valves or louvers against leakage of tempering fluid.
Figure 12:
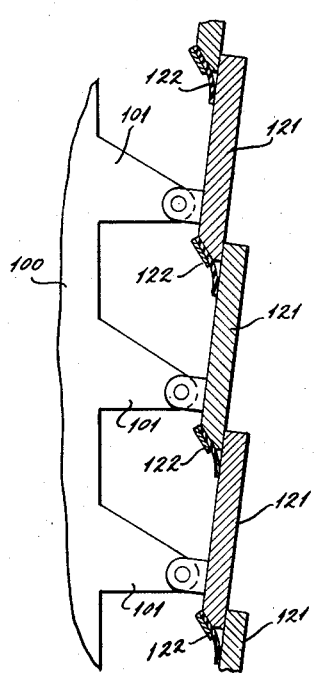
Figure 13:
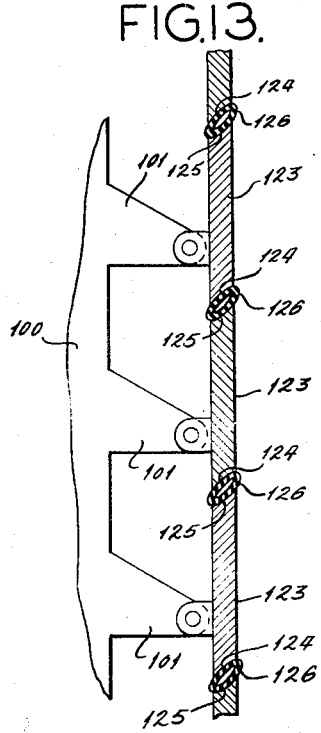
Figure 14:
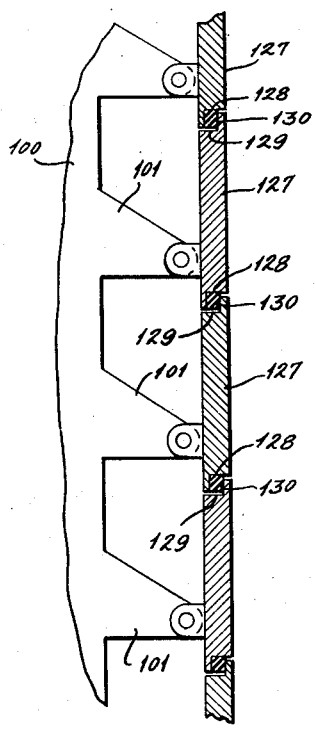

In Figs. 11 to 14 there are shown certain variations of means to seal the adjacent margins of the valves or louver means, as differentiated from the disclosure in Fig. 9 for example where the column 100 has arms 101 on which the valves 56 are pivotally mounted. In Fig. 11, however, the valves 117 have beveled margins 118 and 119 in adjacent relation when closed, and seals 120 are carried near margins 118 to overlap margins 119. In Fig. 12 the valves 121 are in angular lapped relation with seals 122 mounted on certain of the valve margins to contact adjacent margins on others of the valves. In Fig. 13 the valves 123 have adjacent beveled margins 124 and 125 in spaced relation so that tubular seals 126 carried on one of the margins may be compressed by the adjacent valve margins when the valves are in closed positions. In Fig. 14 the valves 127 have oppositely rabbeted margins 128 and 129 so that a right angular (a square being shown) section seal 130 may be carried in one rabbet to engage in the adjacent rabbet with the valves closed. Any of the foregoing valve and seal arrangements may be substituted in Fig. 6 for the valves 56 and seals 59 therein shown, and the operating or control systems will not be materially affected thereby.

Figure 15:
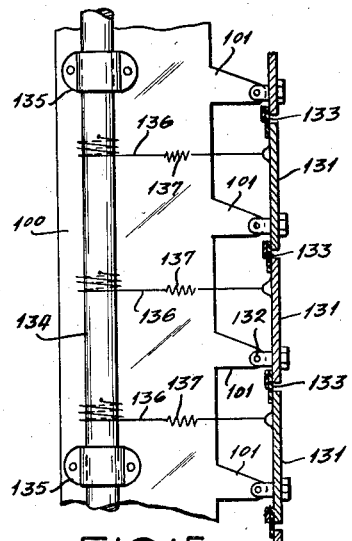
Figs. 15 and 15a are further fragmentary transverse sectional elevational views of another arrangement of valves or louver means and the control thereof.
Figure 15A:
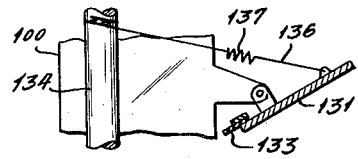
Figure 16:
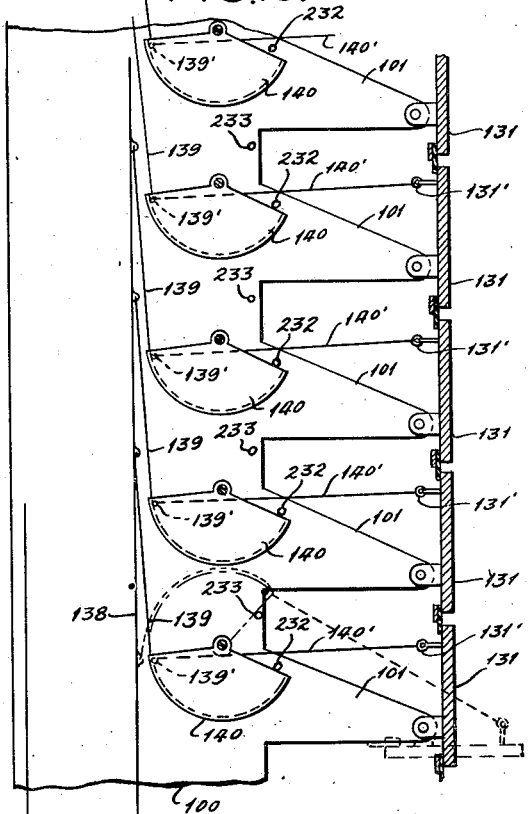
Fig. 16 is still a further fragmentary transverse sectional elevational view of an arrangement of valves or louver means and the control thereof.
Figure 17:
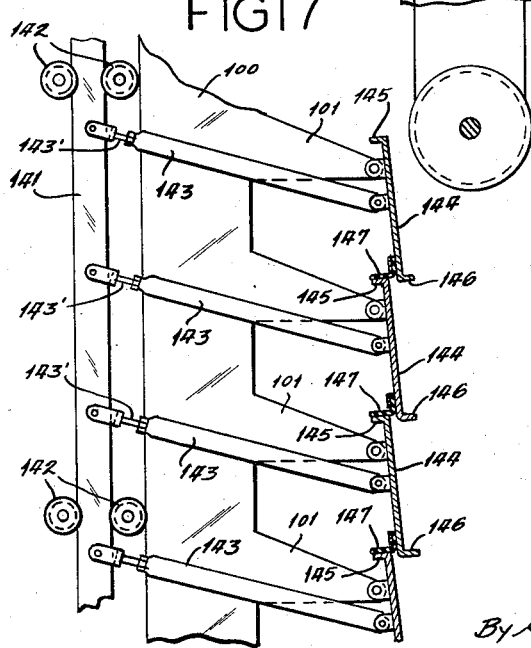
Fig. 17 is yet another fragmentary transverse sectional elevational view of an arrangement of valves or louver means and the control thereof.

Figs. 15, 16 and 17 disclose valves pivotally mounted on column and arm means like that shown in Figs. 11 to 14, but the valve control system for each thereof has been modified as will now be described. In Fig. 15, the valves 131 are pivoted at 132 to arms 101, with valve seals 133 cooperating therewith. A torque rod 134 is rotatably mounted on the side of column 101 in spaced bearings 135. Each valve 131 is operably connected to the torque rod 134 by a pull cable 136, and a spring or other tension element 137 is interposed in each cable to hold the valves closed under tension and to absorb shock upon valve actuation. Rotation of the torque rod 134 may be obtained through a suitable known type of bevel or angle gear drive (not necessary to show) between it and the shaft 70 of Fig. 6. Fig. 15a shows the valve in partly open position.

Fig. 16 discloses a modified control system in which control cable 138 has lateral pull cords 139 connected at pins 139' to rotary sector pulleys 140 operably mounted on column 100 opposite the valves 131. Each pulley 140 pivots between limited positions defined by stop pins 232 and 233 in column 100. A valve cord 140' is connected to each valve at the element 131' and to the associated pulley 140 at pin 139'. The sector pulleys 140 are held by the fluid against stops 232 with the cords 140' below the center of pulley rotation. This locks the valves 131 in closed position. The valves are released by the cable 138 pulling the cords 139 upwardly to raise the valve cords 140' above center. At this instant, the valves are unlocked and flip open, rotating the pulleys 140 upwardly against stop 233 (see broken line position of the bottom pulley 140 in Fig. 16). Stops 233 can be located to alter the valve open position. Since cable 138 and cords 139 are flexible there will be no restriction on the action of the pulleys 140. Closing of the valves 131 is accomplished by pulling down on cords 139 to rotate the pulleys 140 back to the full line positions shown. Suitable means may be used to keep the cords 139 in the pulley tracks, such means being known.

Fig. 17 shows a control rod 141 movable vertically between pairs of guide rolls 142, and push-pull rods 143 extending between the rod 141 and the valves 144 below the pivots therefor. Each rod 143 has a suitable adjustment clevis 143' as shown. Each valve 144 may be of formed character having oppositely turned lips 145 and 146, with the lip seal 147 adapted to close upon lip 145 of an adjacent valve. The actuation of control rod 141 may be achieved in the same manner as has been shown for bar 81 in Fig. 6.

Fig. 20 illustrates a modified valve control system which may be substituted for the system of Fig. 8. The column 150 hereof has arm 151 secured thereto and extending toward the line of valves 56, with a pivot ear 152 to receive the valve pivot element 153. Arm 151 carries a pivoted detent 154 formed with a cam stop 155 at one end and an eye finger 156 at the other end. The associated valve 56 carries a dog element 157 having a cam head 158 which engages with the stop 155 in valve closed position. The detent is pivoted by the cable 159 running through the finger eye until a fixed cable bead element 160 strikes and raises the finger to depress the cam stop 155. The valve 56 is restored automatically to closed locked position through the action of rollers 46 on frame 45, as described in connection with Fig. 6.

The present method may be practiced by means of the simplified apparatus shown in Figs. 18 and 19, wherein the tempering tank 162 has side walls 163, end walls 164 and the bottom wall 165. This tank is open at the top to receive the valve units 166 which are inserted and sealed to the adjacent tank walls in any suitable manner, whereby a dry zone or space to receive the sheet material S is formed therebetween. Referring to Figs. 18 and 19, each unit 166 includes a frame consisting of side pieces 167, top piece 168, bottom piece 169, and an inner wall having upper portion 170 and bottom portion 171. A gap is formed between the wall portions 170 and 171 and the side pieces 167 in which a plurality of valves 172 are disposed to close the gaps and retain the tempering fluid in the spaced reservoir sections R. These reservoir sections R may be filled with fluid in any suitable manner, such as that shown in Fig. 1, and a cross flow conduit 173 connects the two sections R for equalizing the contents thereof. A drain conduit 173' in the bottom of the space to receive the sheet S is provided to assure a dry condition up to the time the fluid is released.

Each unit 166 carries a vertical column member 174 having spaced arms 175 arranged opposite each valve 172. Each valve 172, on the other hand, has a pair of actuating levers 176 spaced apart and located on opposite sides of the column member 174. A suitable pivot element 175' connects arm 175 and levers 176. The valves are also pivoted by suitable means 172' to the sides 167. Only one set of these paired levers 176 may be seen in Figs. 18 and 19, however reference is directed to Figs. 21 and 22. The sets of levers are adjustably connected to operating bars 178 which are, in turn, pivotally connected to a push-pull rod 179 which is also the piston rod for a piston element 180 in the cylinder 181 mounted upon a bracket 182 under the top piece 168 of the unit 166. There are two such cylinders, and power fluid from a suitable source (not shown) is connected thereto for joint actuation of the pistons 180 to open the valves 172 by elevating the pistons.

Figs. 21 and 22 disclose the details of the valve actuating means described in Figs. 18 and 19, and no further explanation is needed except to point out that the valves 172 have marginal seals 183.

The means illustrated in Fig. 23 is similar to that shown in Fig. 21, except that each valve 182 has a pivot plate 183 attached thereto with the pivot ear 184 projecting through a suitable aperture 185 to receive the pivot forming element 186 attached to the fixed column 187 as shown. Valve arm 188 is fixed to the valve 182 and connected to the operating bar 178 as described for Figs. 18 and 22. The fluid flow pattern for the collective set of valves 182 may be varied by means of the intervalve shutters 189 pivoted at 190 and adjustably set at any one of the stop holes 191 in arm 188. Each shutter carries a bracket 192 having a detent pin to engage in any selected hole 191.

Fig. 24 discloses a rack and sector gear control means in place of the means of Fig. 22, whereby the valves 172 may be moved about the pivots on arms 175 carried by the column 174. In this assembly, each valve 172 is provided with a sector gear 193 which engages a common rack bar 194 vertically movable adjacent roller guides 195 on the column. The bar 194 may be moved by the cylinder means 181 shown in Fig. 18 or by means of shaft 70 and cable 80, as shown in Fig. 6.

A further tempering apparatus has been diagrammatically disclosed in Figs. 26 and 27. The tempering tank 200 is formed with spaced reservoir chambers 201 of closed type, each chamber having an inner wall 202 with valves 203 pivoted therein to close off an open top dry central zone or space 204 for the sheet material S. Each chamber 201 is provided with a pressure fluid conduit 205 connected into an inflatable and collapsible bag or container 206, the latter being collapsed in Fig. 26 so that a full quantity of tempering fluid may be supplied to the chamber from any suitable source, as in Fig. 1. The valves 203 may be controlled by any of the means shown in the previously described disclosures. A guard partition 207 adjacent each bag prevents fouling the bag in the valve control means.

Comparing Figs. 26 and 27, it will become evident that application of pressure in the bags 206 will expand the same (Fig. 27) and increase the pressure on the tempering fluid. Thus, when the valves 203 are opened, the fluid will rush into the tempering zone 204 and engulf the sheet S uniformly and thoroughly. Since the pressure exerted upon inflation of the bags 206 increases somewhat in the lower strata of the fluid it is contemplated that the lower valves of each group may be opened less than those nearer the top, as shown in Fig. 27. Any of the described fluid circulating and drainage provisions may be used herewith.

Figs. 28, 29 and 30 illustrate diagrammatically a further modified apparatus for carrying into practice the method of this invention. In these views, the tempering tank 209 is provided with the intermediate walls 210 in which a plurality of valves 211 are operatively mounted according to any of the previously described structures, and any of the control systems may be employed. These walls 210 partly define tempering fluid reservoirs at 212 which are equalized by the cross flow conduit 213 adjacent the bottom of the area 214 wherein the sheets S (Fig. 28) is placed. The area 214 is emptied after each operation by means of a suitable pump 215 having its suction conduit 216 leading from the lower portion of the area 214 and a discharge conduit 217 directed into one of the reservoir portions 212. The fluid, in this case is reused and the level in both reservoir portions 212 is equalized by the cross flow conduit 213. A suitable drain system may be used for the bottom of space 214, as has already been indicated in other views.

Fig. 31 diagrammatically illustrates another modified apparatus adapted to receive sheet material S' having a curved or non-linear form in at least one direction. The reservoirs for tempering fluid indicated at 219 and 220 have opposed inner walls 221 and 222 respectively constructed in angularly related sections so as to provide a suitable area for the non-linear sheet material S'. In this case the walls 221 and 222 are provided with vertically arranged valves or louver means 223 to allow the angular relation between wall sections. Some of the previously described valve control means may be used to regulate these vertical valves, such as the controls shown in Fig. 6 for example. The requirement for positive actuation for both opening and closing movement should be observed, as the closing rollers 46 (Fig 6) may not be used herein.

Figs. 32, 33 and 34 diagrammatically illustrate further examples of tempering apparatus in which certain parts are similar to that shown in Figs. 28 to 30 and are designated by similar reference numerals. In Figs. 32 and 33 the lower portions 225 of walls 210 are set angularly to the vertical to cooperate with the valves 226. The valves 226 are shown set in overlapped relation and may be opened to any desired angular setting as shown in Fig. 33 or 34. Any of the previously disclosed control systems can be employed with these valves, and it is presently contemplated that the valves of Fig. 12 will be especially suitable.

In Fig. 34, the valves 226 are diagrammatically illustrated in variably open positions to control the tempering fluid flow for sheet material S" having a non-linear shape in the vertical direction. In this case the valves 226 are opened in a non-uniform manner so that the discharging fluid may carry across the variable space between the valves and the curved portions of the sheet at about the same time to accomplish over-all surface contact at the same instant. The non-uniform valve opening may be controlled by the means shown and described in Fig. 25, or the same may be accomplished by the intervalve shutters of Fig. 23.

Fig. 35 diagrammatically illustrates a possible arrangement for the apparatus of Fig. 18, wherein inner walls 227 are angularly divergent from top to bottom, so that the bottom valves 226 are farther from the sheet S than the upper valves. This apparatus simplifies the valve control system as the greater fluid pressure naturally existing near the bottom of the tank 209 may be used to force the discharge flow past the valves at a greater speed and thus the fluid will carry across the longer distance and hit the sheet S at about the same instant as the upper strata of fluid which has a lesser pressure and shorter travel distance. It is apparent that the valves 226 as units may be angularly shifted to parallel positions or any intermediate position, as well as divergently upward.

The tempering apparatus in Fig. 36 diagrammatically illustrates a similar tank 209 having the valves 226 mounted in the walls 210 and operated by suitable controls previously detailed, but not here shown. The tempering area between walls 210 is large enough to receive a hoist means 228 which is used to lower and raise a frame 229 carrying valve closing rollers 230, and the rollers are resiliently urged against the valves 226 by an internal spring 231. This frame and the rollers thereon act in a manner similar to the means shown in Figs. 3 and 6 to automatically close the valves upon withdrawal of the sling 228.

In certain instances it has been found very desirable to control the temperature of the fluid or liquid retained in the reservoirs of the apparatus hereinabove described to accomplish the character of tempering desired. In Figs. 1 and 3, the apparatus 16 is shown provided with temperature control means 240 arranged in the reservoir spaces adjacent the outer walls 17. Means 240 is represented by pipe coils or tube banks to conduct a temperature controlling medium for heat exchange with the contents of the reservoir. Steam, hot liquid, brine or a refrigerant may be employed as this medium, and supply and return conduits 241 and 242 respectively are provided. A similar temperature control arrangement is shown for the apparatus disclosed in Figs. 28, 29 and 30. Any of the known control devices may be used, as a temperature bulb 243 controlling valve 244 shown in Fig. 1.

The present invention has disclosed apparatus provided with fluid reservoir means and valve control means, whereby the valves (or louvers) may be tripped for sudden opening movement to release the reservoir fluid. The sudden valve opening movement may be uniform, or it may vary and be non-uniform as to time or extent of opening, or both. The criterion is that the treating fluid reach all surfaces of the body or sheet at the same time. A flat surfaced body does not present as difficult a problem as an irregular surface body, but the control means hereof will allow for a range of conditions encountered in commercial practice of the invention.

For example, Figs. 5, 6 and 25 disclose means 68 on rods 66, in turn, connected to the valves 56. The means 68 act as resilient and adjustable stops for checking the extent of opening of the valves 56. It is obvious that these stops 68 can be variously adjusted along rods 66 to obtain the varied valve open conditions as are shown in Figs. 27 and 33 to 36 inclusive. In this system of control, the valves 56 may be tripped to move to open position simultaneously, or the opening movement may be progressively timed across the face of the valve assembly. One way to obtain time of valve opening variation is to locate the lifters L on bar 81 to give the desired timing (Figs. 5, 6 and 15). Another way is to change the position of bead means 105' (Fig. 9) along the cable 106 so that the locking levers 104 may be variously tripped to release the associated valves in the order desired. Fig. 20 may be regulated as described for Fig. 9. The same principle can be applied to the other forms of the valve control means herein shown and described. The principal aim being to obtain substantially simultaneous engulfing of the body surfaces (both faces if a sheet) to quench uniformally or avoid the unequal shrinkage effects. This can be obtained by either uniform or non-uniform valve opening tripping means.

The valve opening control may also be arranged to allow valve opening variations in groups. Thus, the bottom series of valves could be opened at least to a thirty degree angle, the middle series of valves to some angle from forty-five to sixty degrees, and the upper series to ninety degrees. Variations from this would be possible to correct the flow to obtain a desired wall of fluid advancing upon the body surface at a uniform rate over its area.

Attention is directed to the fluid or liquid action which is believed to occur when the valves are suddenly opened. Obviously these valves consume some space and cause the fluid or liquid to start movement from the stored condition as many thin or narrow strips or bands moving on their individual fronts toward the position of the body to be tempered. Initially, the uncontrolled individual fronts have a velocity which is a function of the pressure upon the strata of fluid or liquid from which the front starts. A very short distance out from the starting point, the fronts expand and tend to merge into an unbroken, larger fluid or liquid front which may be like a moving wall having a frontal contour directly dependent upon the velocity of advance of the separate fronts. Such a moving wall would, it is believed, have a faster advancing lower group of fronts than the middle or upper group of fronts, due to the difference in pressures at the depths in question. One means to control the contour of the moving wall of fluid or liquid is to restrict the volume of the fluid or liquid in the individual fronts having the greater velocity. Another means would vary the angle of starting movement relative to the position of the object to be tempered. Volume and angle control may be combined in the valve means above described. Still another means to obtain this control is to regulate the pressure exerted so that the fronts having equal areas and equal pressures move at about the same velocity, or the areas may be selectively graduated to produce the moving wall contour desired under equal pressure conditions.

It should now be apparent that the present invention attains certain new and improved results in the tempering of sheet materials, as well as other materials. It should also be clear that the method disclosed may be practiced by the use of apparatus other than that specifically shown and described, or by the use of such equivalent apparatus as may reasonably be included herein. Broadly stated the method involves the creation of a wave front or wall of tempering liquid moving toward all of the surfaces of the material or body to be treated and developing frontal contours such that nearly simultaneous contact with the surfaces is positively established over the full area thereof, and an engulfing flood is achieved.

It is pointed out that the temperature control means 240 may be used to maintain a predetermined temperature condition of the tempering liquid so that the desired differential in temperature between the body and the liquid can be obtained. Thus, make-up liquid can be blended into the reusable liquid, a fresh charge of liquid may be brought to the condition desired, and many other conditions can be reached to suit the material being treated.

What is claimed is:

1. A method of tempering a body which includes supporting the body free of restraint in a substantially dry zone, and releasing a large volume of tempering liquid directly at and upon and over all surfaces of the body to engulf the surfaces of the body.

2. A method of tempering sheet material which includes collecting bodies of liquid adjacent opposite sides of a tempering zone, unrestrainedly supporting the sheet material to be tempered in the tempering zone, and releasing the collected bodies of liquid all over and at the same time to form waves from the opposite sides to engulf the sheet material and substantially simultaneously flood the surfaces thereof.

3. A method of tempering sheet material which includes unrestrainedly suspending the sheet material in a tempering zone, storing tempering liquid outside of the tempering zone, and releasing the liquid suddenly and substantially completely from its stored location upon the surfaces of the sheet material to engulf all surfaces of the sheet substantially simultaneously.

4. A method of tempering bodies, sheets or the like which comprises placing a body in a substantially dry confined zone with its surfaces exposed, storing tempering liquid at the outside of the confined zone in depth at least equal to the depth of the zone, and releasing the liquid into the zone selectively from top to bottom to create walls of tempering liquid moving upon the opposite sides of the body to reach and engulf all surfaces substantially simultaneously from top to bottom.

5. A method of tempering sheets, bodies or the like which comprises locating the body in a substantially dry zone, storing tempering liquid outside of the dry zone, and suddenly releasing the liquid in a plurality of closely spaced elongated fronts moving at speeds selectively controlled to form a frontal wave comprising a substantially unbroken liquid blanket contacting the surfaces of the body substantially simultaneously.

6. A method of tempering heat treatable material which comprises placing the material in a tank with its surfaces spaced from the tank walls, opening the tank walls at least in area corresponding to the surface area of the material to discharge the liquid upon the material, and regulating the rate of liquid flow through the tank walls to create a frontal wave and assure substantially simultaneous contact of the liquid upon the surfaces of the material.

7. A method of tempering heat treatable material including the steps of storing tempering liquid, withholding the liquid from an initially substantially dry zone confined in part by controllable valve means, supporting the material in the dry zone free of the valve means, and utilizing the weight of the liquid for moving the valve means toward open positions rapidly to effect substantially uniform tempering of the surfaces of the material by substantially simultaneous contact of the liquid upon the surfaces.

8. The tempering or quench hardening of material which comprises forming a volume of liquid into a moving wall having a frontal contour similar to the surface of the material and directing the fluid wall upon the surface at such a rate that the surface is engulfed substantially simultaneously.

9. The tempering or quench hardening of material which comprises discharging a reservoir of liquid in walls having frontal contours similar to the surfaces of the material and causing the liquid walls to contact the surfaces substantially simultaneously by varying the rate of discharge of the liquid forming the walls in accordance with the distance to the surfaces of the material from the reservoir.

10. The tempering or quench hardening of material which comprises suddenly releasing liquid in a plurality of small area fronts at velocities which unite the fronts into substantially unbroken walls having advancing frontal contours at least corresponding to the surface of the material, directing the liquid walls toward the material to simultaneously engulf the surfaces thereof, and controlling the temperature of the liquid so released upon the material.

11. The tempering or quench hardening of material which comprises releasing stored liquid upon the surfaces of the material in walls of liquid having substantially continuous frontal areas making over-all contact with the surfaces of the material substantially simultaneously to engulf the surfaces, and regulating the rate of release of the liquid in selective areas of the liquid walls to form the liquid wall front to the contour of the surface of the material to assure the over-all contact.

12. Apparatus for tempering hardenable material including means for supporting the material in a container, two series of valves arranged in spaced relation and located on opposite sides of said container, means for storing a quantity of liquid outside said container but communicating with each series of valves, and means operably connected to said two series of valves to open the valves for releasing the stored liquid to form moving bodies of liquid having frontal areas directed at the opposite sides of the material in said container.

13. Apparatus for tempering sheet material including, means for supporting a sheet in a vertical plane, two series of valves arranged in spaced relation on opposite sides of the plane of support of the sheet, means for storing tempering liquid adjacent each series of valves, valve opening control means connected to each of said series of valves, and actuating means connected to said control means to open both series of valves and release the tempering liquid at the opposite sides of the plane of support of the sheet in moving bodies of liquid having vertical frontal area corresponding with the contour of the surfaces of the sheet material.

14. Apparatus for tempering hardenable material including a frame structure having a tempering zone adapted to receive the material with its surfaces exposed in the tempering zone, two series of elongated operatively arranged valves in said frame structure in spaced relation, each series of valves being adapted to form part of a wall for the tempering zone, liquid reservoirs adjacent each series of valves outside the tempering zone, and means operably connected to said two series of valves to simultaneously operate said valves for releasing the liquid to form liquid bodies having frontal areas advancing toward the surfaces of the material exposed in the tempering zone to have substantially simultaneous contact.

15. Apparatus for tempering hardenable material including a frame structure having a tempering zone adapted to receive the material with its surfaces exposed in the tempering zone, two series of elongated valves operatively arranged in said frame structure in spaced relation, each series of valves being adapted to form part of a wall for the tempering zone, liquid reservoirs adjacent each series of valves being adapted to form part of a wall for the tempering zone, liquid reservoirs adjacent each series of valves outside the tempering zone, and means operably connected to said two series of valves to simultaneously operate said valves for releasing the liquid selectively depthwise of the reservoirs to form liquid bodies having frontal areas advancing toward the surfaces of the material exposed in the tempering zone to have substantially simultaneous contact.

16. Apparatus for tempering sheet material including a frame structure having a tempering zone adapted to receive the material with its surfaces exposed in the tempering zone in a vertical plane, two series of elongated valves operatively positioned in said frame to form walls for the opposite sides of the tempering zone, liquid reservoirs adjacent each of said series of valves outside the tempering zone, and means operably connected to said two series of valves to open said valves together, said valves directing the tempering liquid toward the plane of support of the sheet in the form of walls of liquid of substantially continuous vertical extent.

17. Apparatus for tempering sheet material including a frame structure having a tempering zone adapted to receive the material with its surfaces exposed in the tempering zone in a vertical plane, two series of elongated valves operatively positioned in said frame to form walls for the opposite sides of the tempering zone, liquid reservoirs adjacent each of said series of valves outside the tempering zone, and means operably connected to said two series of valves to open said valves selectively depthwise of said reservoirs, said valves directing the tempering liquid toward the plane of support of the sheet in the form of walls of liquid of substantially continuous vertical extent.

18. Apparatus for tempering sheet material including, a reservoir for storing tempering liquid, valve means positioned in said reservoir in spaced relation to define wall areas of an initially dry tempering zone in the space therebetween, said valve means being adapted to retain the liquid outwardly of said zone, and means operably connected to said valve means to open said valves for releasing the liquid depthwise of said reservoir to cause the formation of walls of liquid having substantially unbroken frontal areas converging upon the surfaces of sheet material in said tempering zone at substantially the same instant.

19. The apparatus set forth in claim 18, wherein heat exchange means is provided in said reservoir to condition the tempering liquid as to temperature.

20. The apparatus set forth in claim 18, wherein said valve means includes a plurality of individually pivoted valve members having adjacent margins, and sealing means mounted on one margin of each valve member in position to seal with the adjacent margin of another valve member to retain the liquid out of the tempering zone when said valves are in closed position.

21. The apparatus set forth in claim 18, wherein said means operably connected to said valve means includes adjustable means to vary the extent of opening thereof, and other means connected to all of said adjustable means to operate said valve means substantially simultaneously.

22. Apparatus for tempering sheet material including, reservoir means for storing tempering liquid, two series of valves positioned in said reservoir means in vertically extending and horizontally spaced relation to define a sheet material tempering zone therebetween and retain the liquid outwardly of said zone in spaced reservoir sections, means for removably supporting a sheet in a generally vertically extending position in said zone, and means operably connected to said two series of valves to open said valves for releasing the liquid in two substantially vertically and horizontally uninterrupted walls of liquid moving toward each other and maintaining substantially coextensive frontal areas for substantially simultaneous contact on the opposite sides of a sheet supported by said supporting means.

23. The apparatus set forth in claim 22, further including means for removing the tempering liquid from the tempering zone, and conduit means interconnecting the reservoir sections to equalize the level of the liquid stored therein.

24. The apparatus set forth in claim 22, further including pump means having a suction connection in said tempering zone and a discharge open to said reservoir means.

25. The apparatus set forth in claim 18, in which pressure expandable means is disposed in said reservoir in position to exert a pressure upon the tempering liquid therein to decrease the natural depthwise pressure gradient in the tempering liquid.

26. The apparatus set forth in claim 25, wherein said pressure expandable means is disposed above the tempering liquid in said reservoir, and guard means is disposed between said pressure expandable means and said valve means.

27. In apparatus for tempering hardenable material reservoir means for tempering liquid, wall means in said reservoir means setting apart a material receiving space from said reservoir means, said wall means including valve elements constituting the major portion of the wall area, adjustable mechanism connected to said valve elements to retain said valve elements closed, and control means operably connected to said mechanism to effect operation thereof releasing said valve elements for opening movement to release the tempering liquid to said material receiving space.

28. The apparatus set forth in claim 27, wherein said adjustable mechanism includes a valve motion checking means for each valve element.

29. The apparatus set forth in claim 27, wherein each of said valve elements comprises an elongated member pivoted in said wall to move about an axis extending in the lengthwise direction thereof.

30. The apparatus set forth in claim 29, wherein said adjustable mechanism includes toggle means connected to each of said valve elements and motion checking means connected to each of said toggle means.

31. A method of tempering a body which includes supporting the body in a fixed position and free of restraint in a substantially dry zone, and releasing a quantity of tempering liquid to form a substantially solid frontal wave directed at and upon and over all surfaces of the body to engulf the body surfaces and holding the liquid about the body after its release.

32. A method of tempering sheet material which includes unrestrainedly suspending the sheet material in a stationary position in a tempering zone, and releasing the liquid suddenly and substantially completely from its stored location upon the surfaces of the sheet material to engulf all surfaces of the sheet substantially simultaneously, and holding the liquid in the tempering zone.

33. A method of quench hardening a body which includes supporting a heated body in a dry zone with its surfaces exposed therein, collecting a body of quenching liquid adjacent the dry zone and at least to a depth to completely flood the dry zone and the body, and releasing the collected liquid into the dry zone to rush at the surfaces of the heated body and create an impact and a scouring action upon the body surfaces such that liquid vapor formation is swept away by the impact of the liquid on the body and the volume of liquid which follows.

34. In apparatus for quenching a body by the impact and scouring action of the release of stored liquid quenchant so that its energy is converted into the impact and scouring action, comprising means defining a zone to receive a body, said means including movable elements adapted to open the zone to communication from the exterior, means adjacent the exterior adapted to store a body of liquid quenchant for delivery into said zone, and means to move said elements to open said zone to the liquid quenchant and to direct the movement thereof relative to and upon the body.

35. The apparatus set forth in claim 34, wherein said means defining a zone to receive the body, includes a fixed wall structure with said movable elements carried therein, and intervalve means carried by certain of said elements outwardly of the body receiving zone, said intervalve means adjusting the pattern of flow of the liquid quenchant with respect to the body.

36. The apparatus set forth in claim 35, wherein said intervalve means is pivotally connected to said certain movable elements, and detent means adjustably secures the intervalve means to the movable elements.

References Cited in the file of this patent
UNITED STATES PATENTS

| 2,320,115 | Young | May 25, 1943 |
| 2,375,944 | Quentin | May 15, 1945 |